United States Patent [19]

Miyata

[11] Patent Number: 4,725,259

[45] Date of Patent: Feb. 16, 1988

[54] BELT DRIVE METHOD AND APPARATUS

[75] Inventor: Hirofumi Miyata, Sennan, Japan

[73] Assignee: Bando Kagaku Kabushiki Kaisha, Kobe, Japan

[21] Appl. No.: 844,859

[22] Filed: Mar. 27, 1986

[30] Foreign Application Priority Data

Mar. 29, 1985 [JP] Japan ................................ 60-067325

[51] Int. Cl.$^4$ ........................ F16H 9/00; F16H 11/00

[52] U.S. Cl. ........................................ 474/70; 474/74

[58] Field of Search ...................... 474/70, 71, 72, 73, 474/74, 79

[56] References Cited

U.S. PATENT DOCUMENTS 4,392,840 3/1983 Radocaj .......................... 474/117 X 4,613,318 9/1986 McWilliams et al. ................ 474/74

FOREIGN PATENT DOCUMENTS 2096237 10/1982 United Kingdom .

*Primary Examiner*—George A. Suchfield

*Attorney, Agent, or Firm*—Marshall, O'Toole, Gerstein, Murray & Bicknell

[57] ABSTRACT

This disclosure relates to a belt-drive method and apparatus wherein the rotational force of a drive shaft is accompanied by minute fluctuations in the angular velocity, and a driven shaft has rotational inertia. A one-way clutch is provided in the belt drive, which forms a selective interruption of the rotational force transmission through the belt drive while the angular velocity at the drive shaft side is decelerating, the force being transmitted only while the angular velocity is increasing.

11 Claims, 5 Drawing Figures

BELT DRIVE METHOD AND APPARATUS

FIELD AND BACKGROUND OF THE INVENTION

This invention relates to a belt-drive method and apparatus, and, more specifically, it relates to a method and apparatus for use in a situation where power is transmitted via a belt from a drive shaft to a driven shaft having rotational inertia, and is accompanied by minute fluctuations in the instantaneous angular velocity.

In instances where an internal combustion engine is used as a drive and this drive force is transmitted to a driven shaft via a belt, the internal combustion engine generates a drive force only during the power or combustion stroke and does not generate the drive force during any other engine stroke. There is a recurring fluctuation in the instantaneous angular velocity of the rotating drive shaft and consequently there is the problem that, as the load on the driven shaft increases, the influence of the fluctuation in the angular velocity becomes more apparent.

For this reason, a flywheel is provided on the crankshaft of the typical internal combustion engine in order to increase the force of inertia and thereby achieve smoother running. However, the twisting strength of the crankshaft places limitations on how far the force of inertia can be increased, thus making it impossible to avoid the occurrence of fluctuations in the angular velocity of the crankshaft (drive shaft) of approximately 1.5~2.0 degrees or less in a gasoline internal combustion engine and of approximately 6~8 degrees or less in a diesel internal combustion engine.

Therefore, for a belt-drive device which uses an internal combustion engine as a power source, the fluctuation in the angular velocity simultaneously also causes the peripheral velocity of the belt to fluctuate, and, in cases where the rotational inertia of the driven shaft is large, slippage between the pulley of the driven shaft and the belt will result from the fluctuation in the peripheral velocity. This in turn causes a considerable reduction in the life of the belt.

For example, in an automobile, although the generator is driven using the internal combustion engine as a power source, because the generator shaft has a large amount of rotational inertia, the fluctuations in the engine angular velocity as described above cause the belt to constantly slip on the pulley of the generator shaft. Even if it is but a minute amount each time, this slipping results in various problems such as wear of the contact surfaces and the generation of frictional heat and noise. Moreover, because, with respect to the drive shaft, the generator has a speed-increasing speed ratio relationship using a small-diameter pulley, the above problems become even more noticeable.

Especially with V-ribbed belts, which are used more and more for the purpose of reducing the amount of space required, because wear of the belt surface is a direct cause of significant shortening of the life of the belt, the slippage is a problem which cannot be overlooked.

In order to solve this problem, various measures have heretofore been implemented to improve the structure or strength of the belt, and these measures have achieved a certain amount of success. Nevertheless, so long as fluctuations in the angular velocity of the drive shaft cannot be avoided, these measures will continue to fall short of a complete solution, and can do no more than reduce the wear of the belt and the generation of noise to a certain extent.

This invention provides new means to, when power is transmitted via a belt between a drive accompanied by minute fluctuations in the angular velocity and a driven shaft having rotational inertia, as in the case of an internal combustion engine, completely eliminate the shortening of the life of said belt resulting from the minute fluctuations in the angular velocity, and thus greatly increase the life of the belt.

BRIEF SUMMARY OF THE INVENTION

This invention comprises a method and apparatus used with the method. The first aspect of the invention is a belt-drive method which, in the transmission, via a drive belt, of the rotational force of drive shaft accompanied by minute fluctuations in the angular velocity to a driven shaft having rotational inertia, has the special feature of a selective interruption of the rotational transmission from the belt to the pulley shaft or from the pulley shaft to the belt only while the angular velocity at the drive shaft side is decelerating. The second feature of the invention is a belt-drive apparatus in which pulleys are mounted to both a drive shaft accompanied by minute fluctuations in the angular velocity, and to a driven shaft having rotational inertia, and in which a belt is wound between said pulleys, and in which either one or both of the pulleys are mounted to the associated shaft or shafts via a one-way clutch which engages only while the angular velocity is accelerating.

BRIEF DESCRIPTION OF THE DRAWINGS

The invention will be better understood from the following detailed description taken in conjunction with the accompanying figures of the drawings, wherein.

DETAILED DESCRIPTION OF THE DRAWINGS

As mentioned above, during the rotational drive force of a conventional internal combustion engine, there is a fluctuation in the instantaneous angular velocity of the crankshaft, of approximately 1.5~2.0 degrees or less in a gasoline engine and of approximately 6~8 degrees or less in a diesel engine. Thus, as shown in FIG. 1, even at constant or normal high-speed rotation, the fluctuation in the angular velocity can be observed at extremely short cycles, such as 1/60 of a second.

Figure 1:
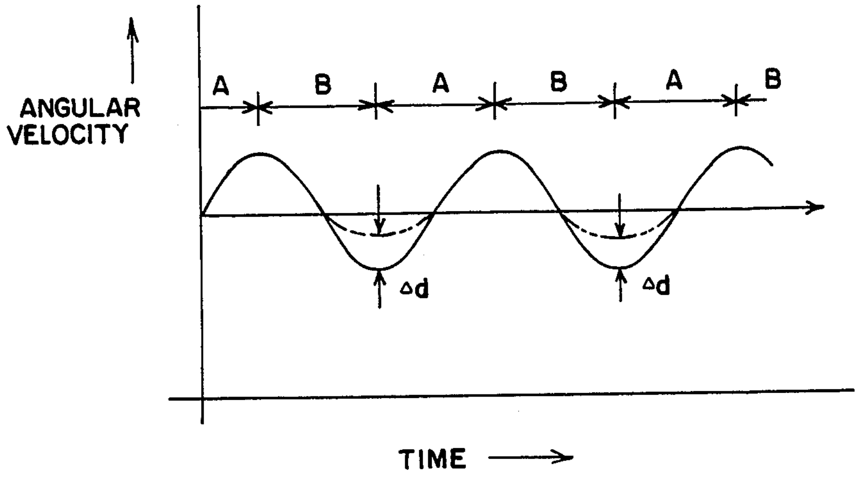
FIGS. 1 and 2 are curves which illustrate the invention.

In such circumstances, with a conventional belt-drive device, if the rotational inertia of the driven shaft is large, when the angular velocity changes from the accelerating velocity shown in range A in FIG. 1 to the decelerating velocity shown in range B in FIG. 1, the driven shaft cannot keep pace with the decelerating velocity of range B, and the angular velocity changes as indicated by the dash-dot line. Thus the difference ($\Delta d$) in the angular velocity is manifested as slippage of the belt.

Consequently, according to this invention, the drive force is transmitted only during the acceleration of the angular velocity of each range A in FIG. 1, and the transmission from the drive side to the driven shaft side is selectively interrupted during the deceleration of the angular velocity of each range B. The rotational speed of the driven shaft is momentarily allowed to become higher than the rotational speed of the drive shaft.

Figure 2:
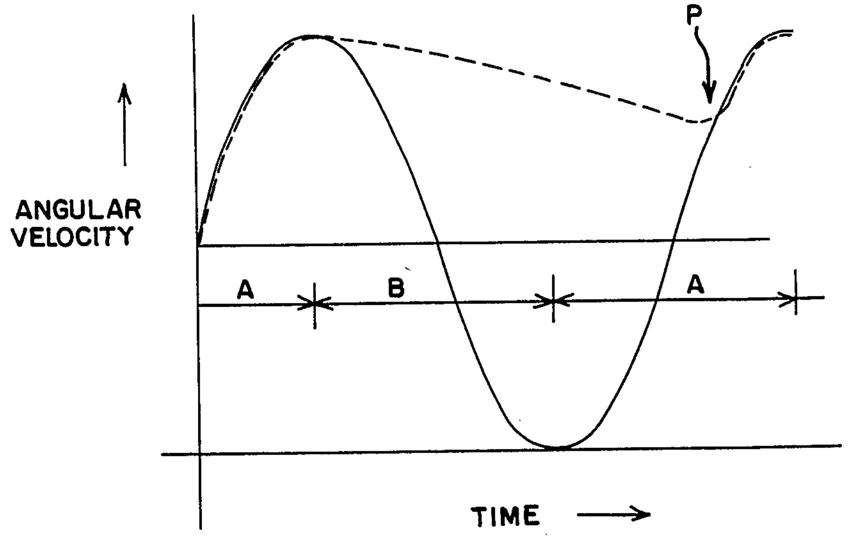

In other words, as shown in FIG. 2, the drive force is transmitted only during the acceleration of the angular velocity of rang A; during range B the driven shaft is allowed to rotate independently as indicated by the broken line; and the two shafts are engaged again when the rotational angular velocity of the driven shaft matches, at point P, the angular velocity of the drive side which is once again accelerating.

Thus, during the disengaged part of the operation, because the drive of the belt is only with a pulley which has considerably less rotational inertial force than the driven shaft, despite the fact that contact is maintained between the pulley and the belt, either no slippage whatsoever occurs or, even if some slippage does occur, it is very slight and has virtually no effect because it is the result of the inertial force of only the pulley wheel.

Figure 3:
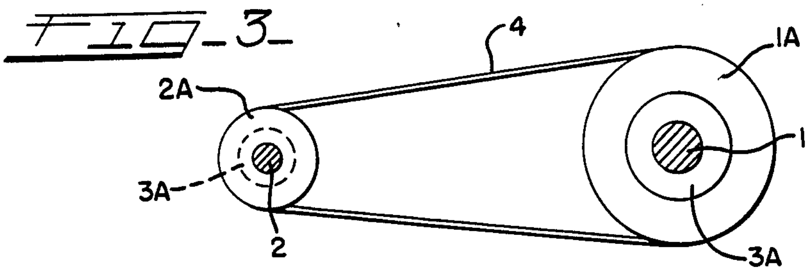
FIG. 3 illustrates apparatus according to the invention.

Regarding apparatus for carrying out the foregoing operation, as shown in FIG. 3, pulleys 1A and 2A are mounted respectively to a drive shaft 1 having recurring small fluctuations in its angular velocity, and to a driven shaft 2 having a relatively large amount of rotational inertia. In an internal combustion engine, for example, the shaft 1 may be the crankshaft and the shaft 2 may be the alternator or generator shaft. One or both of the pulleys 1A and 2A is connected to its associated rotating shaft via a one-way clutch 3A which engages only while the angular velocity is accelerating, and a belt 4 is wound between pulleys 1A and 2A. In the specific example shown in FIG. 3, one clutch 3A is provided and it is connected between the pulley 2A and the shaft 2.

Thus, when the angular velocity of the drive shaft 1 decelerates, rotating shaft 2 spins freely relative to the shaft 1 and runs ahead of shaft 1, the transmission of power is momentarily interrupted.

For the one-way clutch 3A mentioned above, a ratchet-type clutch, a roller-type clutch, or some other commonly available conventional clutch is used, and, as long as it allows rotational transmission in the forward direction only, there are no limitations on the type of clutch.

Figure 4:
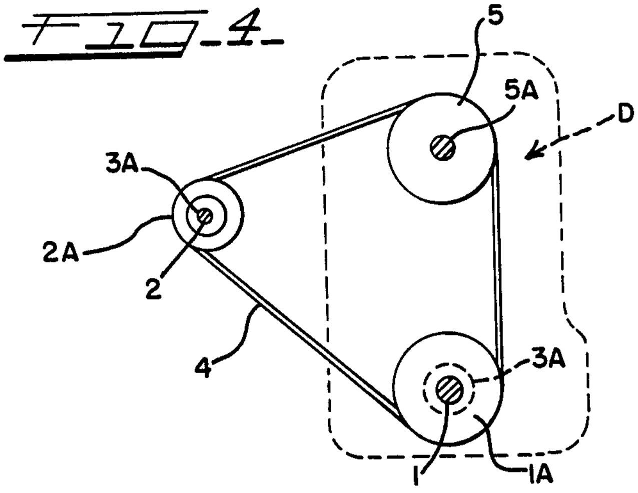
FIG. 4 illustrates an embodiment according to the invention.

In the embodiment shown in FIG. 4 (Embodiment 1), a V-ribbed belt 4 is wound between a 135-mm diameter pulley 1A mounted on the drive or crank shaft 1 of a diesel internal combustion engine D, and a 77-mm diameter pulley 2A is mounted via a roller-type one-way clutch 3A on a generator shaft 2. The number 5 is a 135-mm diameter pulley mounted on a shaft 5A connected to drive a water pump (not shown).

In an alternative to the above arrangement (Embodiment 2), the pulley 1A on the drive shaft side is mounted on the drive shaft 1 via a roller-type one-way clutch 3A (shown in dashed lines), and the other pulleys 2A and 5 are connected directly to their shafts.

As still another alternative (Embodiment 3), both pulleys 1A and 2A are mounted on the drive shaft 1 and on the driven shaft 2 via roller-type one-way clutches 3A.

In all three of the embodiments described above in connection with FIG. 4, the engine was operated and the rotational speed of the drive shaft was gradually increased from about 700 to about 1,300 rpm, and the changes in the angular velocity fluctuations of the generator shaft 2 were measured. The results of these measurements are shown in FIG. 5.

Figure 5:
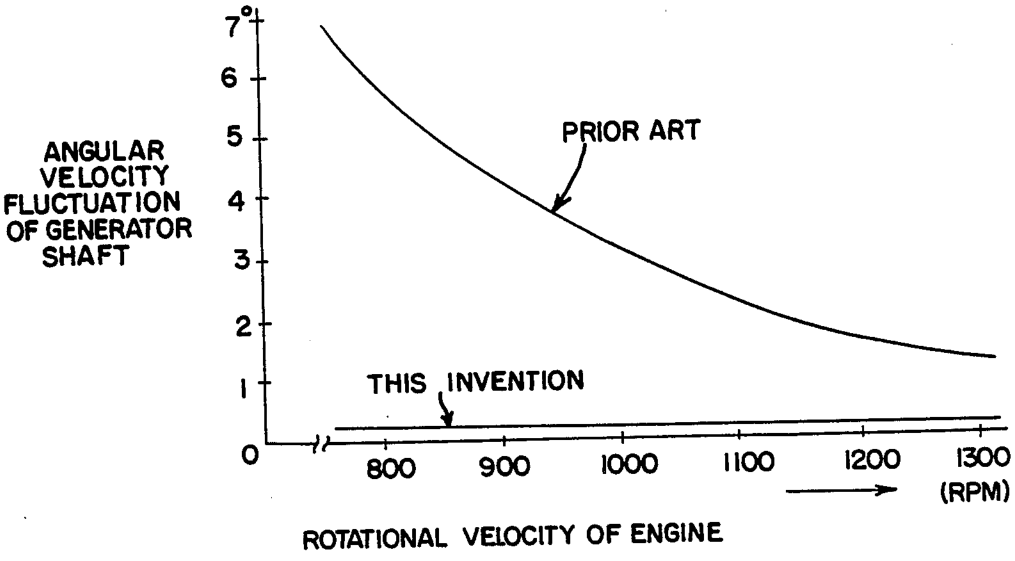
FIG. 5 is a graph showing the test results of apparatus according to the invention.

The curve for the prior art shown in FIG. 5 indicates the angular velocity fluctuation of the generator shaft when one-way clutches were not used. As is clearly shown in FIG. 5, in this invention, despite a smaller diameter of the pulley on the generator shaft than that of the pulley on the drive shaft so as to accelerate the generator shaft, it was confirmed that the angular velocity fluctuation on the generator shaft side was very small and remained constant.

Next, when the belt life, belt heat generation, and belt noise were measured at 850 rpm for each of the three embodiments of FIG. 4, the results shown in the following table were obtained.

The heat generation was measured at a first point where the belt starts to engage the generator pulley, and a second point where the belt leaves the generator pulley.

TABLE

| | Belt Life | Belt heat generation at first point | Belt heat generation at second point | Noise |
|---|---|---|---|---|
| Embodiment 1 | No problems after 100 hours | 18~28° C. | 20~31° C. | None |
| Embodiment 2 | No problems after 100 hours | 19~30° C. | 23~33° C. | None |
| Embodiment 3 | No problems after 100 hours | 10~15° C. | 15~22° C. | None |
| Comparison method (no clutch) | Appearance of cracks after 15 minutes | 71° C. | 78° C. | Squeaking noise |

As is clearly shown in the above table, all three of the embodiments according to the invention were able to withstand continuous use of at least 100 hours and, moreover, there was neither any heat nor noise generated. Thus, in comparison to the prior art, it is clear that this invention displays a remarkable effectiveness.

Further, the results were virtually unchanged when a V belt was used in place of the V-ribbed belt.

It will be apparent from the foregoing that novel and useful apparatus and method have been provided. As described above, in the transmission of the rotational force of a drive shaft which is accompanied by constant fluctuations in the angular velocity, because this invention transmits only the forward-direction rotational force and selectively interrupts the transmission of any rotational force which is in the reverse direction, there is no excessive stress applied to the belt, and the life of the belt is extended. This invention is especially well suited for use in belt-drive devices which perform accelerating power transmission. In addition, because the invention can be implemented simply by mounting a one-way clutch between the pulley and a rotating shaft, embodiments are easily achieved, and it now becomes possible to use the belt drive in power transmission systems in which the crankshaft of a diesel internal combustion engine is used for the drive shaft, something which was heretofore difficult to accomplish. Thus the invention displays considerable effectiveness.

What is claimed is:

1. Belt drive apparatus for connection between a first part and a second part, one of said parts being a rotary drive and the other being a rotating driven part, the drive producing minute fluctuations in the angular velocity thereof and the driven part having rotational inertia, said apparatus comprising first and second shafts drivingly connected respectively to said first and second parts, first and second pulleys, a belt drivingly interconnecting said pulleys, said first shaft being drivingly coupled to said first pulley, and a one-way clutch interconnecting said second shaft and said second pulley, said one-way clutch engaging only while said angular velocity is increasing.

2. Apparatus as in claim 1, wherein two of said clutches are provided, one of said clutches being between each of said pulleys and the associated shaft.

3. An internal combustion engine including belt drive apparatus, comprising a rotary drive shaft and a rotatable driven part, said engine during operation thereof producing minute fluctuations in the angular velocity of said drive shaft, and said driven part having rotational inertia, a driven shaft drivingly connected to said driven part, first and second pulleys operatively coupled to said drive and driven shafts, a belt drivingly interconnecting said pulleys, and at least one one-way clutch between said shafts and said pulleys, said one-way clutch engaging only while said angular velocity is increasing.

4. Apparatus as in claim 3, wherein said clutch is between said driven shaft and said second pulley.

5. Apparatus as in claim 3, wherein said clutch is between said drive shaft and said first pulley.

6. Apparatus as in claim 3, wherein two of said clutches are provided, one of said clutches being between each of said pulleys and the associated shaft.

7. Belt drive method for connecting a rotary drive and a rotating driven part, the drive producing minute fluctuations in the angular velocity thereof and the driven part having rotational inertia, comprising the steps of connecting a drive shaft to said drive, connecting a driven shaft to said driven part, operatively coupling first and second pulleys to said drive and driven shafts, and providing at least one one-way clutch between said shafts and said pulleys, said one-way clutch engaging only while said angular velocity is increasing.

8. A method as in claim 7, wherein said clutch is provided between said driven shaft and said second pulley.

9. A method as in claim 7, wherein said clutch is provided between said drive shaft and said first pulley.

10. A method as in claim 7, wherein two of said clutches are provided, one of said clutches being between each of said pulleys and the associated shaft.

11. A method as in claim 7, wherein said drive is an internal combustion engine and said driven part is a generator of said engine.

* * * * *

US004725259C1

(12) EX PARTE REEXAMINATION CERTIFICATE (5272nd)

United States Patent

Miyata

(10) Number: US 4,725,259 C1

(45) Certificate Issued: Feb. 21, 2006

(54) BELT DRIVE METHOD AND APPARATUS

(75) Inventor: Hirofumi Miyata, Sennan (JP)

(73) Assignee: Bando Kagaku Kabushiki Kaisha, Kobe (JP)

Reexamination Request:
No. 90/006,519, Jan. 21, 2003

Reexamination Certificate for:

| | |
|---|---|
| Patent No.: | **4,725,259** |
| Issued: | **Feb. 16, 1988** |
| Appl. No.: | **06/844,859** |
| Filed: | **Mar. 27, 1986** |

(30) Foreign Application Priority Data

Mar. 29, 1985 (JP) .......................................... 60-067325

(51) Int. Cl.
*F16H 9/00* (2006.01)

(52) U.S. Cl. .......................................... 474/70; 474/74

(58) Field of Classification Search ............. 474/70–74, 474/94, 148, 166, 171; 192/45, 45.1, 30 V; 123/192.1, 198 R
See application file for complete search history.

(56) References Cited

U.S. PATENT DOCUMENTS 4,392,840 A * 7/1983 Radocaj ...................... 474/117
4,613,318 A * 9/1986 McWilliam et al. .......... 474/74

FOREIGN PATENT DOCUMENTS

| | | |
|---|---|---|
| GB | 2096237 | * 10/1982 |
| JP | 56-101353 | 8/1981 |
| JP | 57-17256 | 1/1982 |
| JP | 58-179866 | 12/1983 |
| JP | 59-155346 | 10/1984 |

* cited by examiner

*Primary Examiner*—Thomas R. Hannon

(57) ABSTRACT

This disclosure relates to a belt-drive method and apparatus wherein the rotational force of a drive shaft is accompanied by minute fluctuations in the angular velocity, and a driven shaft has rotational inertia. A one-way clutch is provided in the belt drive, which forms a selective interruption of the rotational force transmission through the belt drive while the angular velocity at the drive shaft side is decelerating, the force being transmitted only while the angular velocity is increasing.

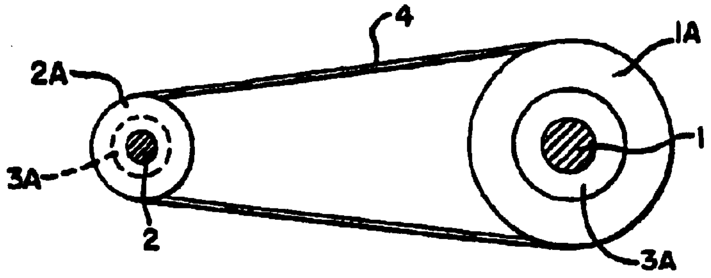

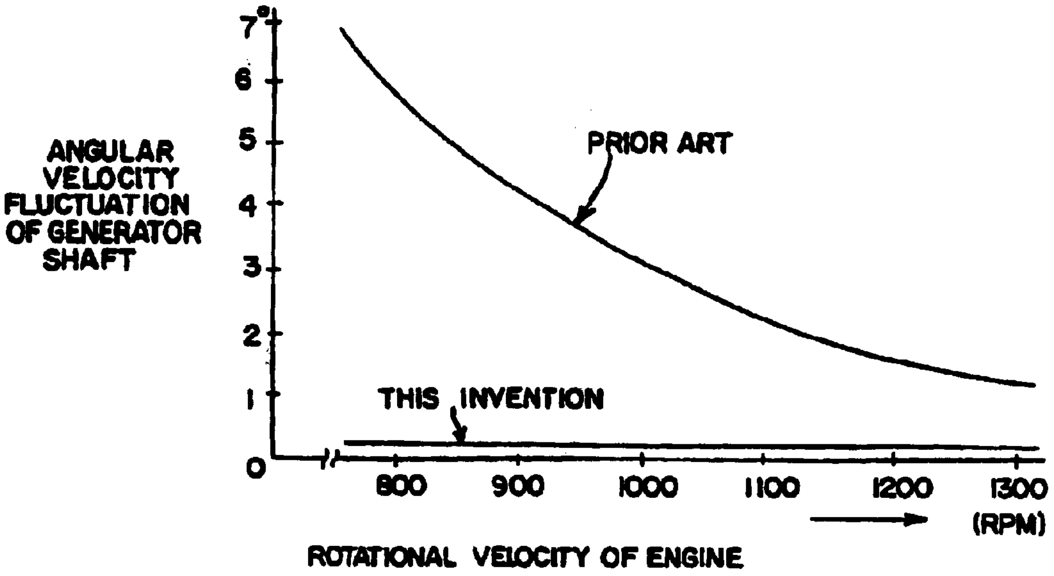

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

* * * * *